(12) United States Patent
Lee (10) Patent No.: US 7,271,859 B2
(45) Date of Patent: Sep. 18, 2007

(54) LIQUID CRYSTAL MODULE HAVING CONNECTOR HOUSING

(75) Inventor: Chan-Heon Lee, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 48 days.

(21) Appl. No.: 10/875,724

(22) Filed: Jun. 25, 2004

(65) Prior Publication Data

US 2004/0263715 A1  Dec. 30, 2004

(30) Foreign Application Priority Data

Jun. 26, 2003  (KR) ............... 10-2003-0041788

(51) Int. Cl.
 *G02F 1/1333* (2006.01)
(52) U.S. Cl. ............... 349/58; 362/630; 362/632
(58) Field of Classification Search ............. 349/58–60
See application file for complete search history.

(56) References Cited

U.S. PATENT DOCUMENTS

| | | | | |
|---|---|---|---|---|
| 5,696,529 A | * | 12/1997 | Evanicky et al. ........... 345/659 |
| 5,739,887 A | * | 4/1998 | Ueda et al. ................. 349/149 |
| 5,831,697 A | * | 11/1998 | Evanicky et al. ............. 349/62 |
| 5,986,737 A | * | 11/1999 | Evanicky et al. ........... 349/137 |
| 6,847,416 B2 | * | 1/2005 | Lee et al. ..................... 349/58 |
| 2002/0186333 A1 | * | 12/2002 | Ha et al. ...................... 349/58 |

* cited by examiner

*Primary Examiner*—Andrew Schechter
*Assistant Examiner*—Lucy Chien
(74) *Attorney, Agent, or Firm*—Morgan, Lewis & Bockius LLP (57) ABSTRACT

A liquid crystal module includes a liquid crystal panel, a backlight unit disposed to supply light to the liquid crystal panel, the backlight unit including at least one lamp housing, a plurality of wires extending from the at least one lamp housing, and at least one connector housing electrically connected to the at least one lamp housing through the plurality of wires. The connector housing includes an outer wall having a hollow therein, a screw hole and a wire hole and being formed as a polyhedral shape, and a plurality of connectors disposed at an opposite side of the wire hole.

12 Claims, 8 Drawing Sheets

LIQUID CRYSTAL MODULE HAVING CONNECTOR HOUSING

This application claims the benefit of Korean Patent Application No. 2003-0041788, filed on Jun. 26, 2003, which is hereby incorporated by reference.

BACKGROUND OF THE INVENTION

1. Field of the Invention

The present invention relates to a liquid crystal module, and more particularly, to a liquid crystal module having a connector housing.

2. Discussion of the Related Art

With improvements in technology, more and more electronic devices are being developed and commercialized. For these electronic devices, it is becoming increasingly important to have external shapes capable of optimizing their values and functions. Recently, electronic devices, such as liquid crystal modules and the like, have been the subject of research and development to effectively optimize their functions and user interfaces in even seemingly small aspects thereof.

Generally, the liquid crystal module includes a liquid crystal panel and a backlight unit. The liquid crystal module is connected to an external circuit and supplied with power and driving signals through a connector. In a large-sized liquid crystal panel, such as a monitor or a television, the liquid crystal module may include a plurality of lamps. Accordingly, it becomes complicated and important to arrange a connection between the liquid crystal module and its external circuit.

Figure 1:
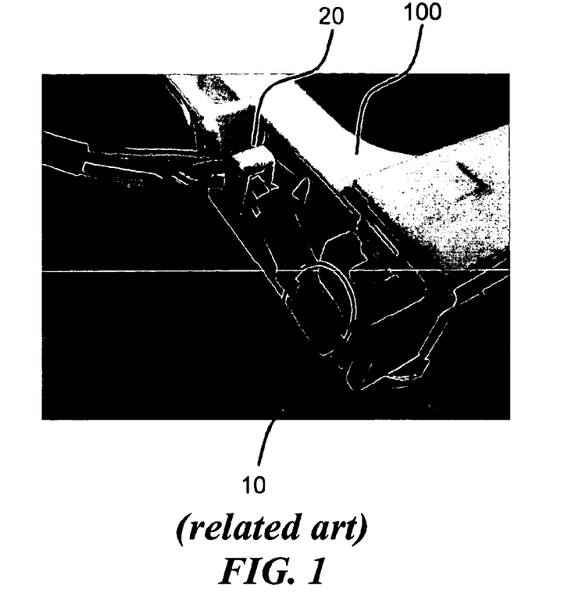
FIG. 1 is a picture of a liquid crystal module according to the related art.
Figure 2A:
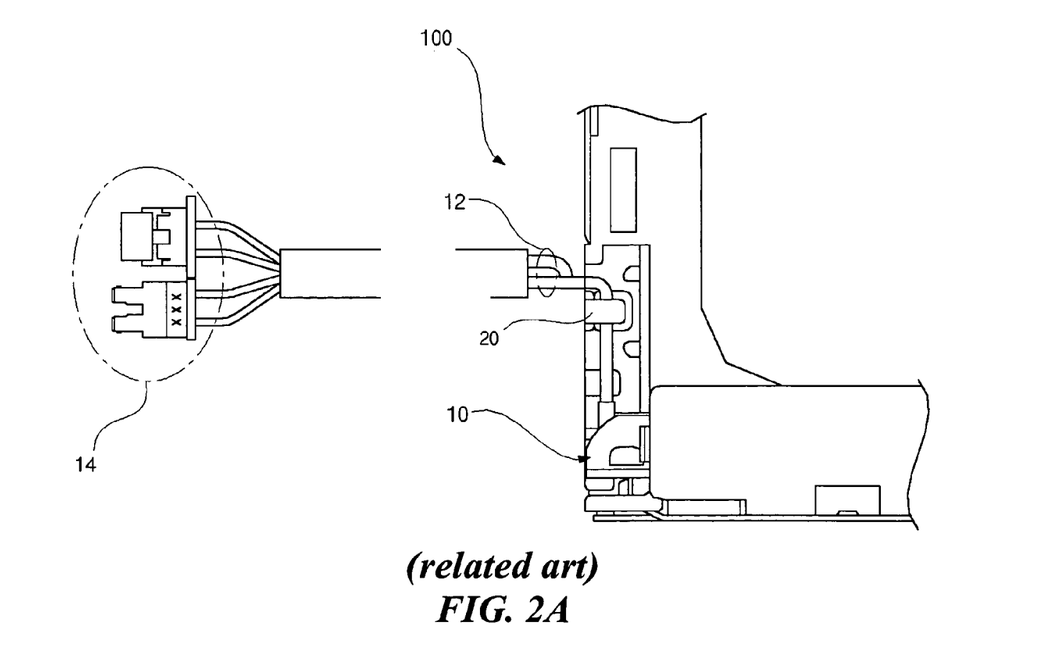
FIG. 2A is a plane view of the related art liquid crystal module of FIG. 1.
Figure 2B:
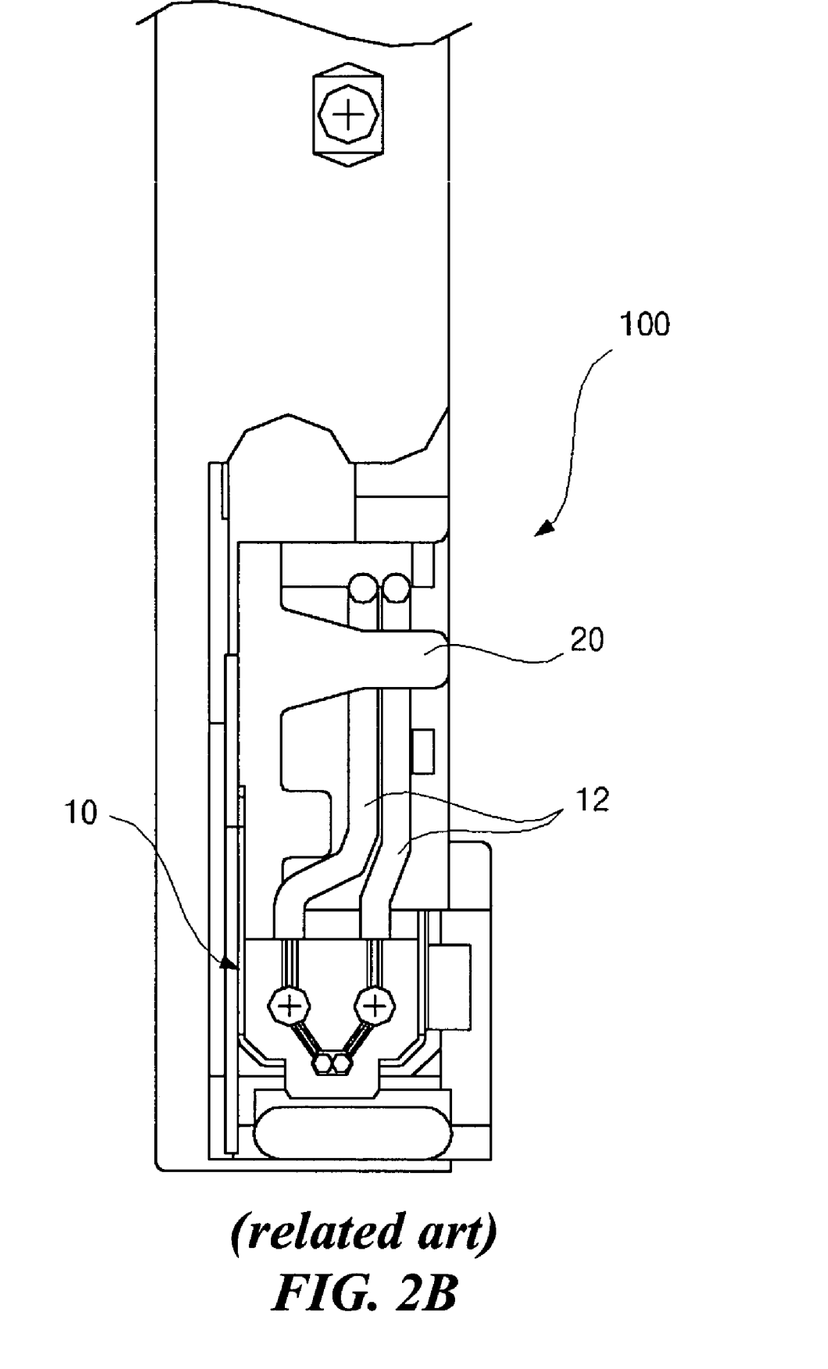
FIG. 2B is a cross-sectional view of the related art liquid crystal module of FIG. 1.

FIG. 1 is a picture of a liquid crystal module according to the related art, and FIGS. 2A and 2B are plane and cross-sectional views of the related art liquid crystal module.

As shown in FIGS. 1, 2A and 2B, a liquid crystal module 100 includes a lamp housing 10. Even though not shown in these drawings, the liquid crystal module 100 includes a liquid crystal panel, and a backlight unit that has a lamp and a lamp housing 10 surrounding the lamp. The lamp housing 10 is combined with the liquid crystal module 100. A plurality of wires 12 for power supply and signal transmission extend from the lamp housing 10. A connector 14, such as a pin or a socket, is formed at one end of the plurality of wires 12, and electrically and mechanically connects the plurality of wires 12 to an external circuit (not shown) that supplies power and driving signals. The plurality of wires 12 are fixed to the liquid crystal module 100 using a wire guide protrusion 20. The wire guide protrusion 20 is formed at a boundary of the liquid crystal module 100 and has a hole therein.

Figure 3:
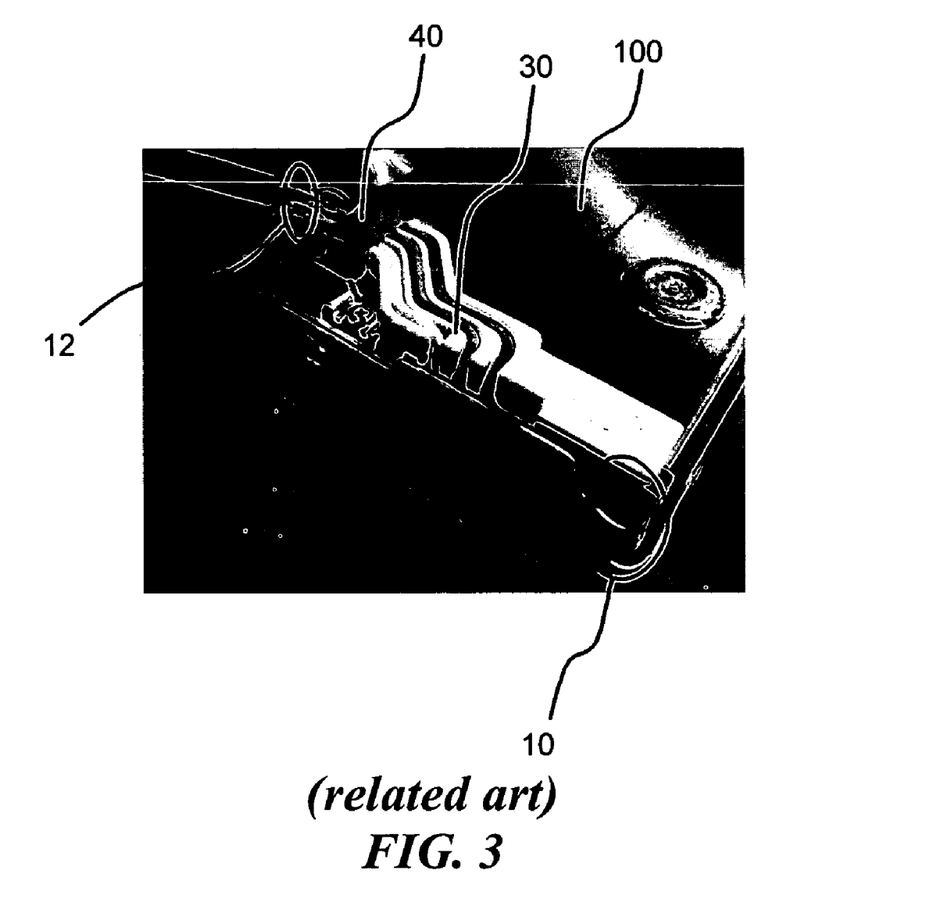
FIG. 3 is a picture of another liquid crystal module according to the related art.
Figure 4:
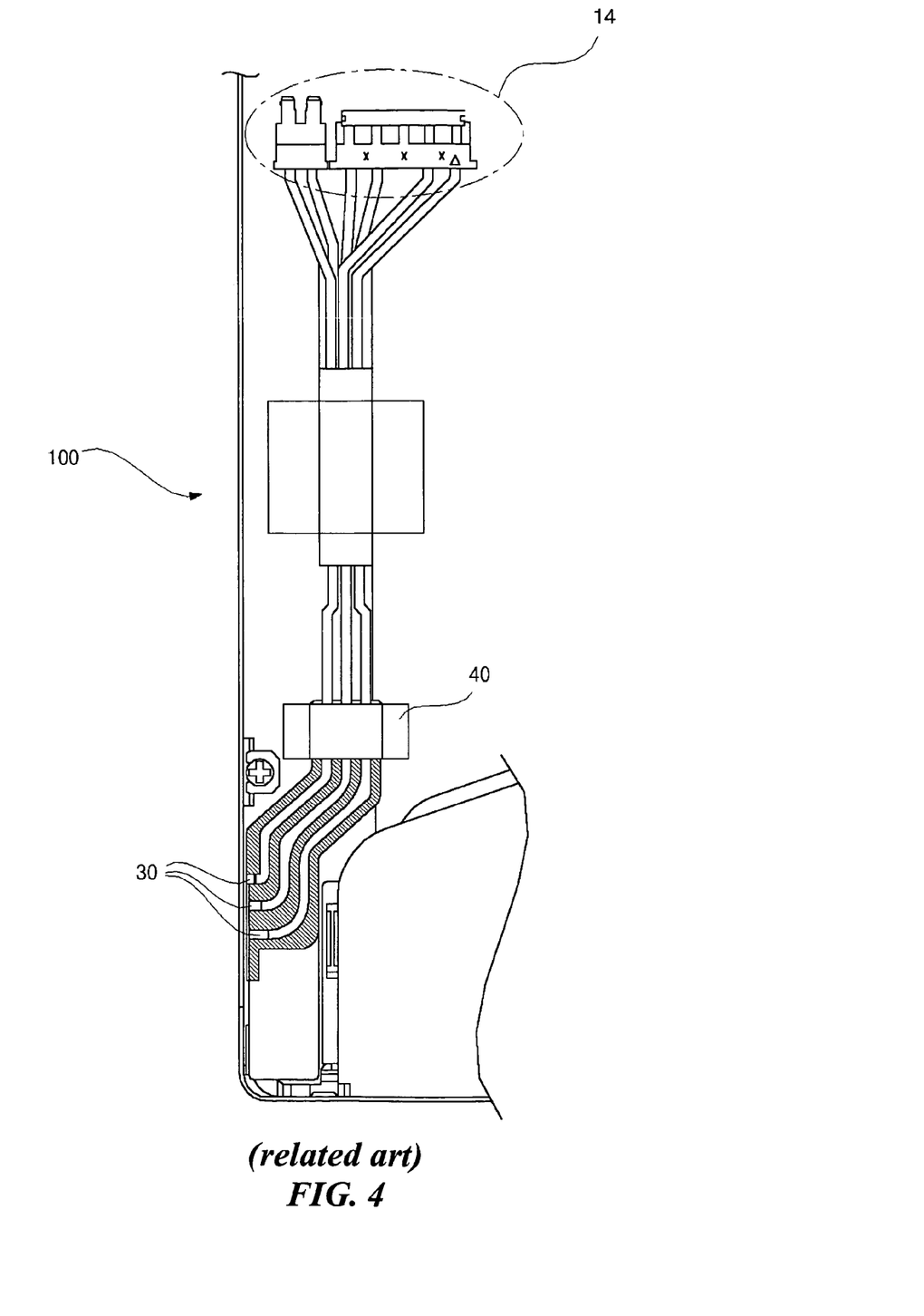
FIG. 4 is a plane view of the related art liquid crystal module of FIG. 3.

FIG. 3 is a picture of another liquid crystal module according to the related art, and FIG. 4 is a plane view of the related art liquid crystal module.

As shown in FIGS. 3 and 4, a liquid crystal module 100 includes a lamp housing 10. Even though not shown in FIGS. 3 and 4, the liquid crystal module 100 includes a liquid crystal panel, and a backlight unit that consists of a lamp and the lamp housing 10 surrounding the lamp. The lamp housing 10 is combined with the liquid crystal module 100. A plurality of wires 12 for power supply and signal transmission extend from the lamp housing 10. A connector 14, such as a pin or a socket, is formed at one end of the plurality of wires 12, and electrically and mechanically connects the plurality of wires 12 with an external circuit (not shown) that supplies a power and driving signals. The plurality of wires 12 are fixed to the liquid crystal module 100 along a wire guide groove 30. The wire guide groove 30 is formed at a boundary of the liquid crystal module 100. In addition, a fixing tape 40 is used at one end of the wire guide groove 30 to prevent detachment of the plurality of wires 12.

In the liquid crystal module 100, however, the plurality of wires 12 are exposed to the outside of the liquid crystal module 100, and the connector 14 is formed at the end of the plurality of wires 12 for connection with the external circuit. Accordingly, an additional means including the wire guide protrusion 20, the wire guide groove 30, and the fixing tape 40 is required for arrangement and treatment of the plurality of wires 12. As a result, a fabrication process for the liquid crystal module becomes complicated. In addition, since the plurality of wires 12 are exposed outside, the plurality of wires 12 are apt to be damaged.

SUMMARY OF THE INVENTION

Accordingly, the present invention is directed to a liquid crystal module and a method of connecting the liquid crystal module to an external circuit that substantially obviates one or more of the problems caused by limitations and disadvantages of the related art.

An object of the present invention is to provide a liquid crystal module having a connector housing so that wires are not exposed the outside of the liquid crystal module.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal module includes a liquid crystal panel, a backlight unit supplying light to the liquid crystal panel, the backlight unit including at least one lamp housing, a plurality of wires extending from the at least one lamp housing, and at least one connector housing connected to the at least one lamp housing through the plurality of wires. The connector housing includes an outer wall having a hollow therein, a screw hole and a wire hole and being formed as a polyhedral shape, and a plurality of connectors at an opposite side of the wire hole.

In another aspect, a connector housing for a liquid crystal module includes an outer wall having a hollow therein, a screw hole and a wire hole and being formed as a polyhedral shape, and a plurality of connectors at an opposite side of the wire hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, similar reference numbers will be used throughout the drawings to refer to the same or like parts.

Figure 5A:
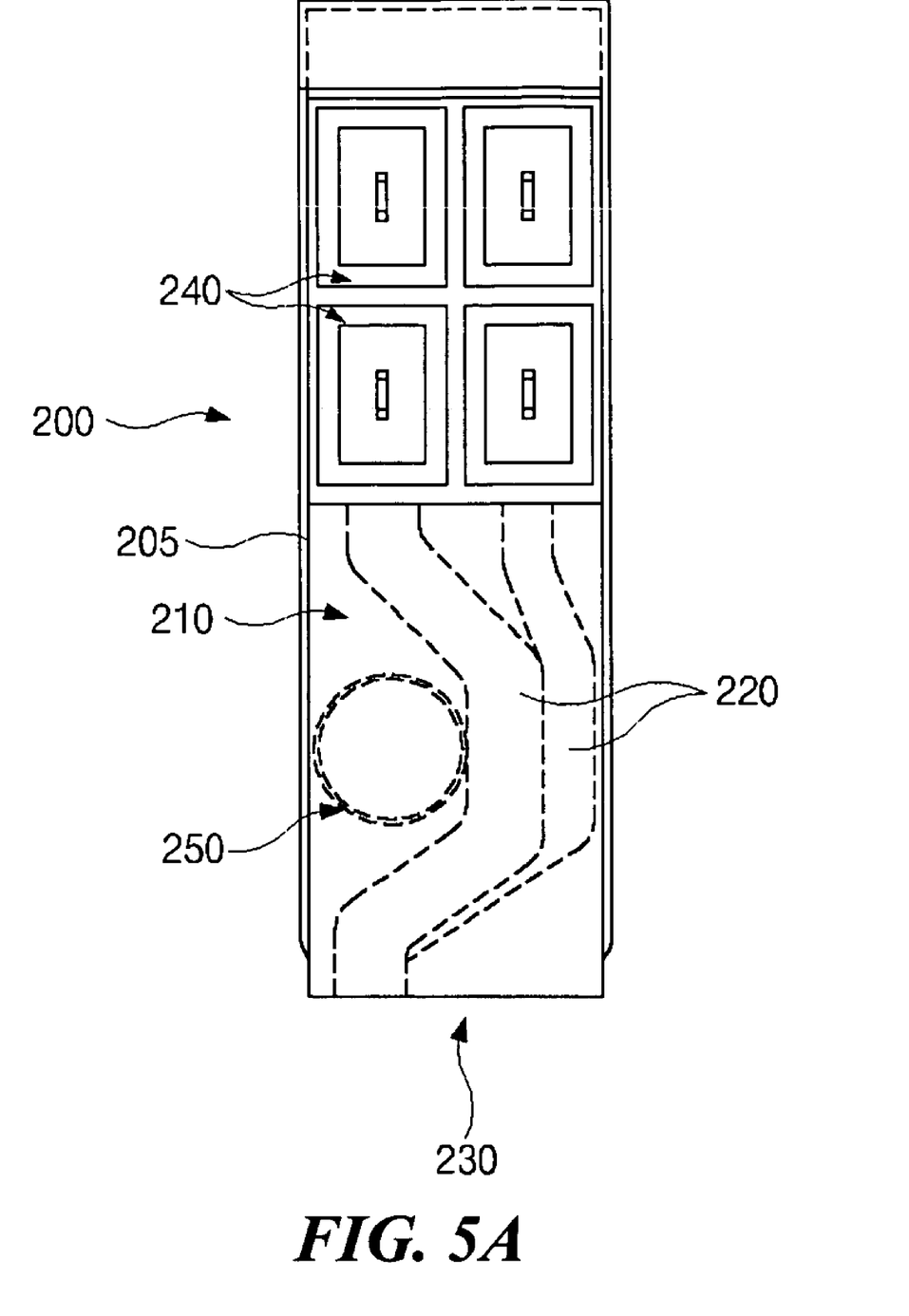
FIG. 5A is a schematic plane view of a connector housing for a liquid crystal module according to an embodiment of the present invention.
Figure 5B:
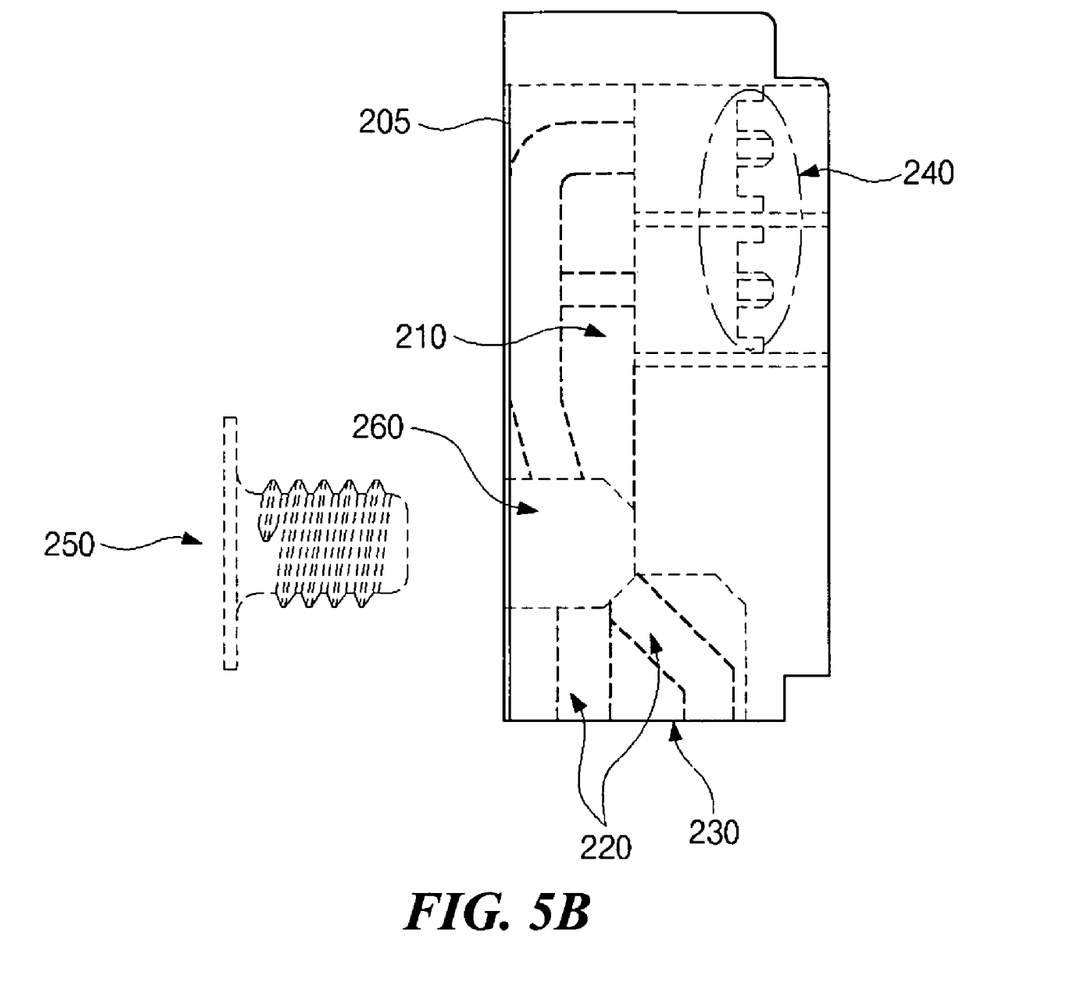
FIG. 5B is a schematic plane view and a schematic cross-sectional view of the connector housing for the liquid crystal module of FIG. 5A.

FIGS. 5A and 5B are schematic plane and cross-sectional views of a connector housing for a liquid crystal module according to an embodiment of the present invention, respectively.

As shown in FIGS. 5A and 5B, a connector housing 200 includes an outer wall 205 having a polyhedral shape such as a hexahedral shape or the like. The outer wall 205 is formed with a hollow 210 and a wire hole 230 connected to the hollow 210 at one side thereof. A plurality of wires 220 may be inserted from one side of the wire hole 230 and arranged in the hollow 210 and connected to a plurality of connectors 240 from the opposite side of the wire hole 230. The number of the connectors 240 may correspond to the number of the wires 220. In addition, as shown in FIG. 5B, the outer wall 205 of the connector housing 200 is formed with a screw hole 260 for interposition of a screw 250. Since the screw 250 is disposed at an outer portion of the connector housing 200, the plurality of wires 220 are gathered in an inner portion of the connector housing 200. In other words, the plurality of wires 220 are arranged in a space between the screw 250 and the outer wall 205. Even though not shown in FIGS. 5A and 5B, the screw 250 may be used to fix the connector housing 200 to a liquid crystal module 300 (of FIGS. 6A and 6B).

Figure 6A:
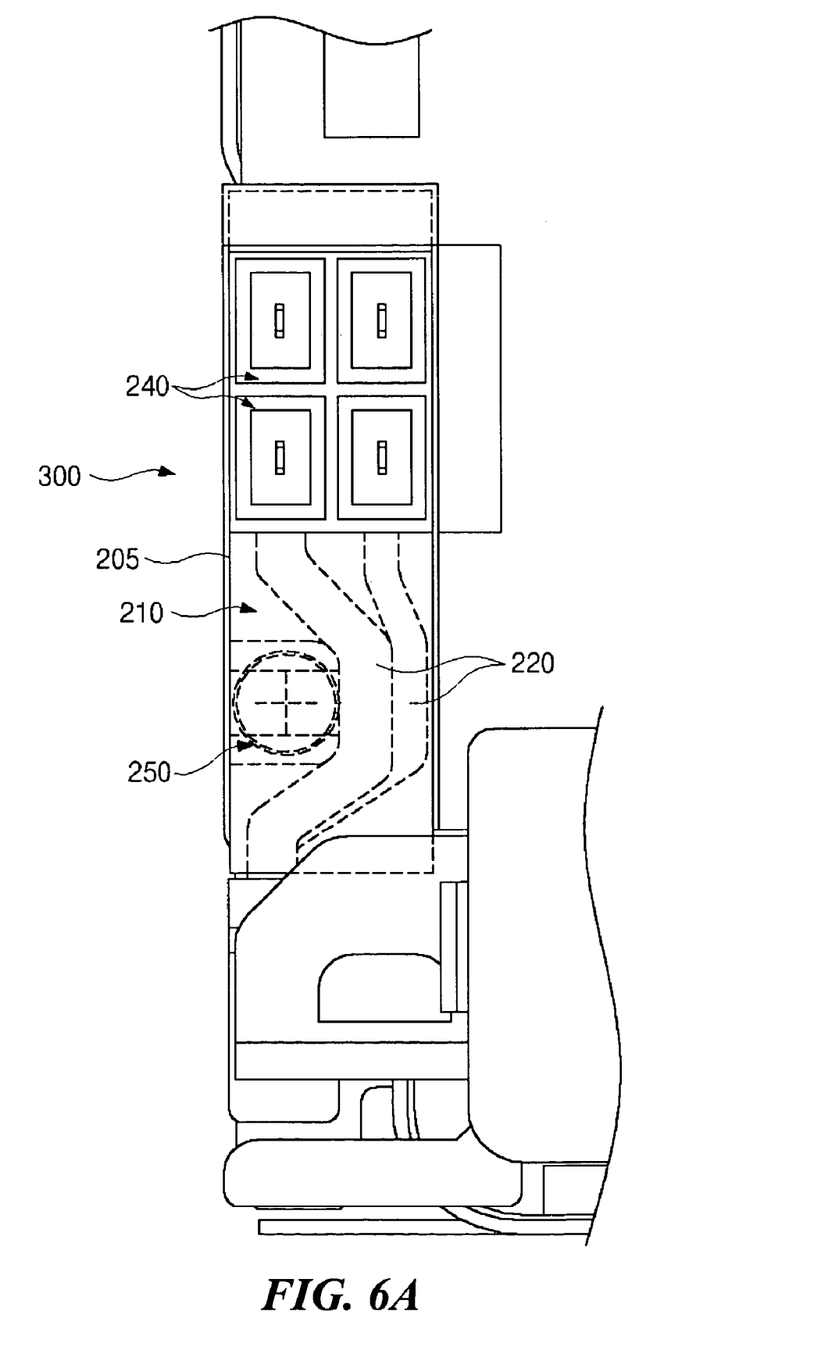
FIG. 6A is a schematic plane view of a connect housing for a liquid crystal module according to an embodiment of the present invention.
Figure 6B:
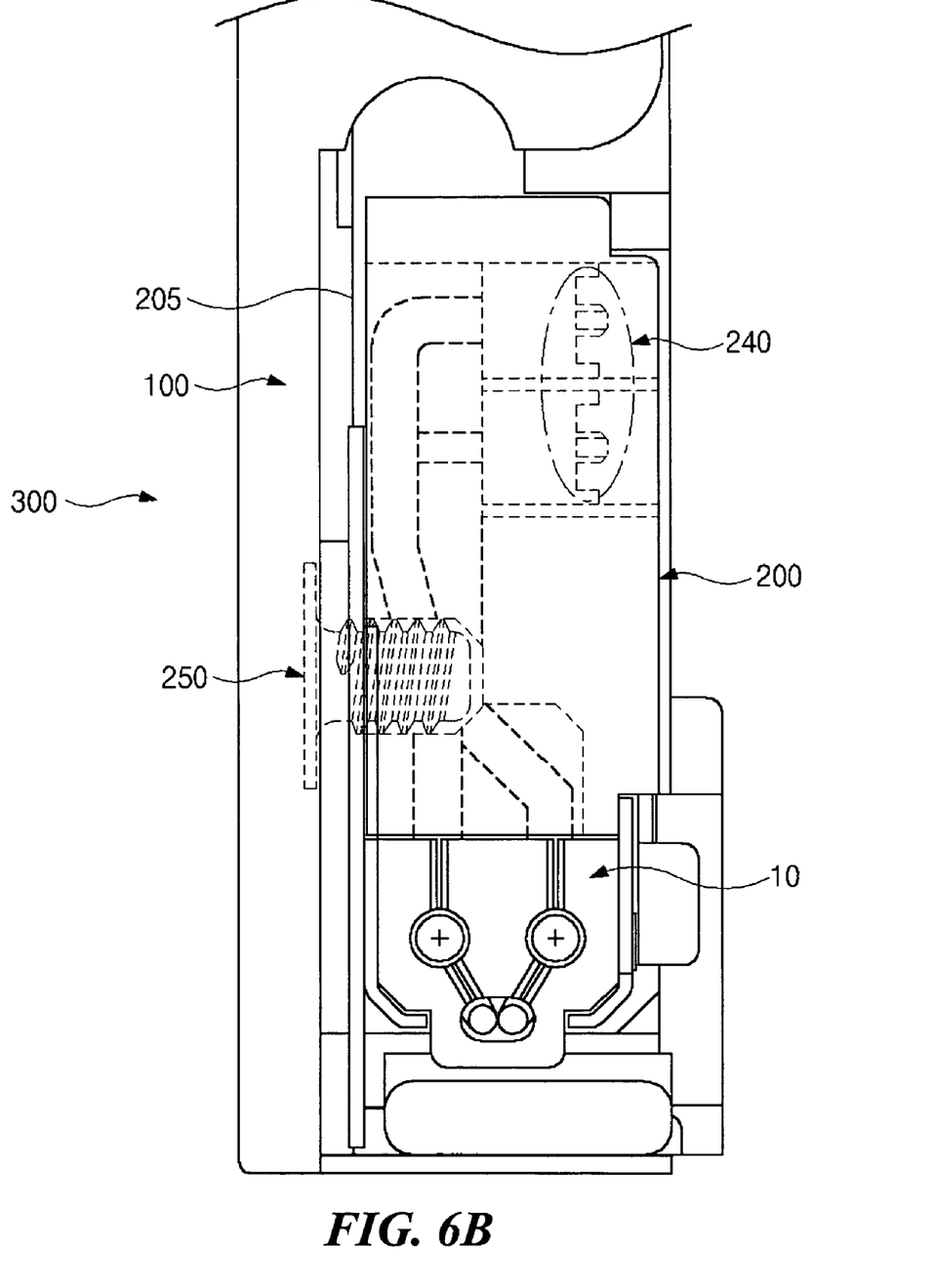
FIG. 6B is a schematic plane view and a schematic cross-sectional view of the connect housing for the liquid crystal module of FIG. 6A.

FIGS. 6A and 6B are schematic plane and cross-sectional views of a liquid crystal module according to an embodiment of the present invention. FIG. 6A shows a bottom portion of the liquid crystal module, and FIG. 6B shows a bottom-left portion of the liquid crystal module.

As shown in FIGS. 6A and 6B, a connector housing 200 is mounted in a liquid crystal module 300 by a screw 250. The connector housing 200 includes an outer wall 205 and a plurality of connectors 240 at one side portion of the outer wall 205. A plurality of wires 220 extend from a lamp housing 10 to a hollow 210 of the outer wall 205 through a wire hole 230 (of FIGS. 5A and 5B) at an opposite side of the plurality of connectors 240. In the hollow 210, the plurality of wires 220 are arranged in an inner portion of the connector housing 200 by the screw 250. Thus, the plurality of wires 220 are arranged inside the liquid crystal module 300 and are not exposed to the outside of the liquid crystal module 300.

Even though not shown in FIGS. 6A and 6B, the liquid crystal module 300 may include a liquid crystal panel, and a backlight unit that supplies light to the liquid crystal panel. The backlight unit may include a lamp, the lamp housing 10 wrapping the lamp, a light guide transmitting light from the lamp, and a plurality of optic sheets such as a diffusing sheet, a compensating sheet, a prism sheet, etc. In addition, when a plurality of lamps are used for a large-sized liquid crystal panel, a plurality of connector housings may be mounted in the liquid crystal module.

In a liquid crystal module having a plurality of lamps according to the present invention, since a plurality of wires are arranged inside of the liquid crystal module using a connector housing, damage to the plurality of wires can be prevented, and the external shape of the liquid crystal module can be improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal module, comprising:
    a liquid crystal panel;
    a backlight unit disposed to supply light to the liquid crystal panel, the backlight unit including a lamp housing;
    a plurality of wires extending from the lamp housing; and
    a connector housing electrically connected to the lamp housing through the plurality of wires, the connector housing including:
        an outer wall having a hollow, a screw hole and a wire hole, the outer wall being formed as a polyhedral shape; and
        a plurality of connectors disposed inside the connector housing and at an opposite side of the wire hole,
    wherein the plurality of wires are disposed only inside the connector housing.

2. The liquid crystal module according to claim 1, wherein the outer wall is formed as a hexahedral shape.

3. The liquid crystal module according to claim 1, wherein the plurality of wires correspond to the plurality of connectors.

4. The liquid crystal module according to claim 1, wherein the wire hole, the screw hole and the plurality of connectors are disposed on different surfaces of the outer wall.

5. The liquid crystal module according to claim 4, further comprising a plurality of screws, each screw being inserted into the hollow through the screw hole.

6. The liquid crystal module according to claim 5, wherein the plurality of screws combine the plurality of connector housings with the liquid crystal module.

7. The liquid crystal module according to claim 5, wherein the plurality of wires are arranged between the outer wall and the plurality of screws.

8. A liquid crystal module, comprising:
    a liquid crystal panel;
    a backlight unit disposed to supply light to the liquid crystal panel;
    a connector housing defining a hollow portion, a wire hole and a screw hole being formed through the connector housing to communicate with the hollow portion;

a plurality of wires extending from the backlight unit and passing through the hollow portion and the wire hole to electrically connect to the backlight unit; and a plurality of connectors disposed inside the connector housing and corresponding to the plurality of wires, wherein the plurality of wires are disposed only inside the connector housing.

9. The liquid crystal module according to claim 8, further comprising a screw being inserted into the hollow portion through the screw hole, wherein a space is created in the hollow portion between the screw and the outer wall to gather the plurality of the wires.

10. The liquid crystal module according to claim 9, wherein the screw joins the connector housing with the liquid crystal module.

11. The liquid crystal module according to claim 8, wherein the plurality of connectors are disposed at an opposite side of the wire hole.

12. The liquid crystal module according to claim 8, wherein the wire hole, the screw hole and the plurality of connectors are disposed on different surfaces of the connector housing.

* * * * *